(No Model.)

E. N. COLWELL.
METHOD OF PRODUCING FORGED ARTICLES FROM SCRAPS OF METAL.

No. 397,278. Patented Feb. 5, 1889.

Witnesses:
H. E. Harrison
J. A. Carline

Inventor,
Evander N. Colwell
per C. D. Levis
att'y.

N. PETERS, Photo-Lithographer, Washington, D. C.

United States Patent Office.

EVANDER N. COLWELL, OF ALLEGHENY, ASSIGNOR OF ONE-HALF TO CHRISTIAN F. KENNEWEG, OF ALLEGHENY COUNTY, PENNSYLVANIA.

METHOD OF PRODUCING FORGED ARTICLES FROM SCRAPS OF METAL.

SPECIFICATION forming part of Letters Patent No. 397,278, dated February 5, 1889.

Application filed September 14, 1888. Serial No. 285,410. (No model.)

*To all whom it may concern:*

Be it known that I, EVANDER N. COLWELL, a citizen of the United States, residing at Allegheny, in the county of Allegheny and State of Pennsylvania, have invented certain new and useful Improvements in a Method of Making Forgings with Dies; and I do hereby declare the following to be a full, clear, and exact description of the invention, such as will enable others skilled in the art to which it pertains to make and use the same, reference being had to the accompanying drawings, which form a part of this specification.

My invention relates to a method for forming from wrought-iron or steel special shapes of forgings; and it consists in a male and female die to form the desired shape of the forging, and of accurately calculating and weighing a suitable quantity of small scrap iron or steel, forming the same in a compact bundle, bringing this bundle to a welding heat, and by a proper flux and by the aid of the dies converting the said bundle into a solid mass, and at the same time form the desired shape of the forging, as will be fully set forth hereinafter.

Figure 1:
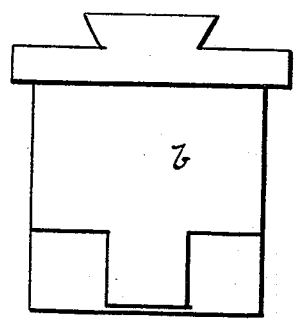
Figure 3:
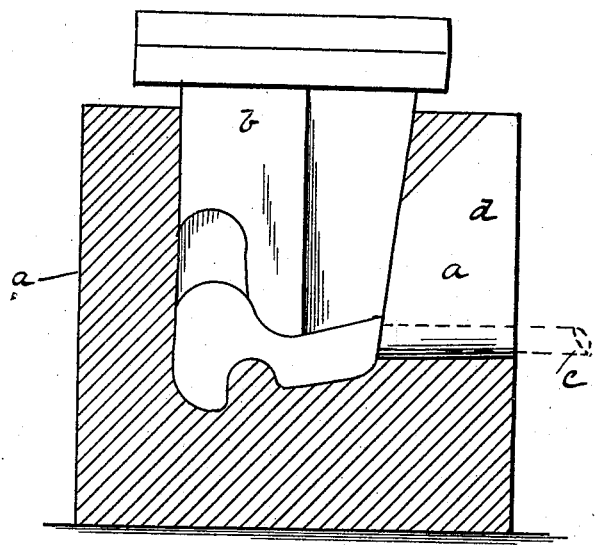
Figure 2:
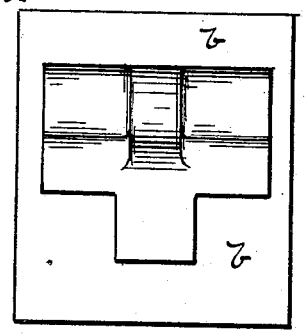
Figure 4:
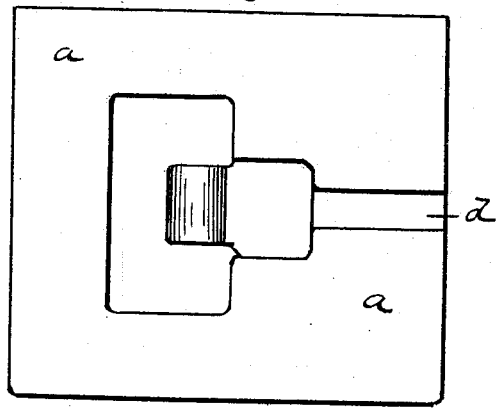
Figure 5:
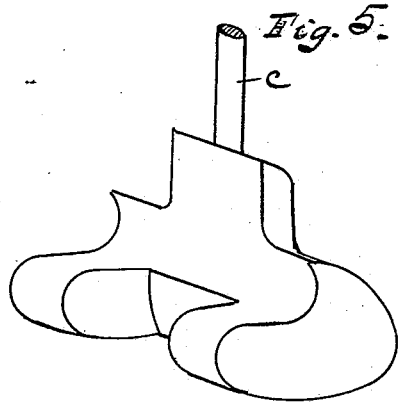

In the accompanying drawings, Figure 1 is a front elevation of a male die such as I use when forming hooks for car-couplers. Fig. 2 is a plan view of the base of the same. Fig. 3 is a side sectional elevation of a female die used for the same purpose, also showing a side elevation of the male die entered into the same. Fig. 4 is a plan view of the female die. Fig. 5 is a perspective view of a coupler-hook such as produced by the above-described dies.

To put my invention into practice, I provide a set of dies, $a\ b$, having formed in the bottom of the female die $a$, and on the base of the male die $b$, an impression suitable for and corresponding with the contour of the article to be formed. These dies $a\ b$ are constructed so as to contain a much larger body than that of the finished article.

In operation a calculation is made of the exact quantity of metal required to form the desired forging, and, when ascertained, a bundle of "scrap" or small pieces of iron having the desired weight, and firmly bound together, is provided. This bundle is placed in a furnace and brought to a welding heat, and, if necessary, a proper flux applied. The bundle when having the required welding heat is quickly placed into the female die $a$ and subjected to an immense pressure applied to the top of the male die $b$. The metal thus placed in the dies $a\ b$ being in a semi-liquid condition fills all the space left between the dies, and thereby forms the desired article. Before placing the heated bundle into the die an iron bar, $c$, is placed in a groove, $d$, formed in the die $a$ and allowed to project a short distance into the die $a$. The object of this bar $c$ is to provide a simple means of lifting the finished article from the female die $a$. The said bar $c$ becomes attached to the forging, and is afterward cut away from the same.

Having thus described my invention, what I claim, and desire to secure by Letters Patent, is—

1. The herein-described method of forming forgings from wrought iron, steel, &c., consisting of placing a bundle of scrap or small pieces of iron into a female die, $a$, the said bundle being at a welding heat, and subjecting the same to a pressure brought against a male die, $b$, whereby forgings from wrought-iron, wrought-steel, &c., may be formed.

2. The improvement in the art of making forgings of the class described, consisting in assembling small or scrap pieces of metal into a bundle, heating the bundle to a welding heat, placing the bundle within a female die constructed to give one part of the bundle the desired external contour, and finally forcing a male die upon the bundle within the female die, whereby the bundle is subjected to a heavy pressure and forged into a homogeneous body of the external contour corresponding to the particular dies used, substantially as described.

In testimony that I claim the foregoing I hereunto affix my signature this 15th day of August, A. D. 1888.

EVANDER N. COLWELL. [L. S.]

Witnesses:
FRANK W. SMITH,
I. A. CARLINE.